US 7,031,928 B1

(12) United States Patent
Cochran

(10) Patent No.: US 7,031,928 B1
(45) Date of Patent: Apr. 18, 2006

(54) METHOD AND SYSTEM FOR THROTTLING I/O REQUEST SERVICING ON BEHALF OF AN I/O REQUEST GENERATOR TO PREVENT MONOPOLIZATION OF A STORAGE DEVICE BY THE I/O REQUEST GENERATOR

(75) Inventor: Robert Alan Cochran, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 09/678,168

(22) Filed: Oct. 2, 2000

(51) Int. Cl.
*G06F 17/60* (2006.01)

(52) U.S. Cl. .................... 705/7; 705/8; 705/9; 705/1

(58) Field of Classification Search .............. 705/7, 705/8, 9, 1
See application file for complete search history.

(56) References Cited

U.S. PATENT DOCUMENTS

| | | | | |
|---|---|---|---|---|
| 3,623,007 A | * | 11/1971 | Eckhart et al. | 713/502 |
| 4,262,331 A | * | 4/1981 | Freeland et al. | 710/124 |
| 5,289,362 A | * | 2/1994 | Liebl et al. | 700/22 |
| 5,920,846 A | * | 7/1999 | Storch et al. | 705/7 |
| 6,011,778 A | * | 1/2000 | Kilkki et al. | 370/232 |
| 6,606,744 B1 | * | 8/2003 | Mikurak | 717/174 |
| 6,847,988 B1 | * | 1/2005 | Toyouchi et al. | 709/203 |

* cited by examiner

*Primary Examiner*—John W. Hayes
*Assistant Examiner*—Akiba Robinson-Boyce

(57) ABSTRACT

A method and system for fairly distributing servicing of I/O requests by a storage device among remote computers that contract for a specified maximum rate of I/O request servicing by the storage device. The remote computers also specify whether the storage device should employ a simple throttling technique or a sliding window throttling technique to limit the rate of I/O request servicing to the contracted-for rate of I/O request servicing. In the simple throttling technique, the storage device services up to some maximum number of I/O requests per unit time for the remote computer, regardless of the overall time-averaged rate of I/O request servicing provided to the remote computer. In the sliding window throttling technique, the storage device maintains an approximate, periodically re-calculated instantaneous rate of I/O request servicing calculated based on recent I/O request servicing by the storage device on behalf of the remote computer. Intervals between servicing of I/O requests are lengthened or shortened in order to continuously adjust the instantaneous rate of I/O request servicing towards the contracted-for rate of I/O request servicing.

20 Claims, 7 Drawing Sheets

METHOD AND SYSTEM FOR THROTTLING I/O REQUEST SERVICING ON BEHALF OF AN I/O REQUEST GENERATOR TO PREVENT MONOPOLIZATION OF A STORAGE DEVICE BY THE I/O REQUEST GENERATOR

TECHNICAL FIELD

The present invention relates to servicing by storage device controllers of input/output requests generated by remote computers, and, in particular, to a method and system for fairly distributing input/output servicing among a number of remote computers.

BACKGROUND OF THE INVENTION

The present invention relates to servicing of input/output ("I/O") requests by a storage device controller. The present invention is described and illustrated with reference to an embodiment included in disk array controller that services I/O requests from a number of remote computers. However, alternative embodiments of the present invention may be employed in controllers of many other types of storage devices as well as in a general electronic server that carries out electronic requests generated by electronic client devices intercommunicating with the general electronic server.

FIG. 1 is a block diagram of a standard disk drive. The disk drive 101 receives I/O requests from remote computers via a communications medium 102 such as a computer bus, fibre channel, or other such electronic communications medium. For many types of storage devices, including the disk drive 101 illustrated in FIG. 1, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 102 to a remote computer, and as a result of a WRITE operation, data is received from a remote computer by the storage device via communications medium 102 and stored within the storage device.

The disk drive storage device illustrated in FIG. 1 includes controller hardware and logic 103 including electronic memory, one or more processors or processing circuits, and controller firmware, and also includes a number of disk platters 104 coded with a magnetic medium for storing electronic data. The disk drive contains many other components not shown in FIG. 1, including read/write heads, a high-speed electronic motor, a drive shaft, and other electronic, mechanical, and electromechanical components. The memory within the disk drive includes a request/reply buffer 105 which stores I/O requests received from remote computers, and an I/O queue 106 that stores internal I/O commands corresponding to the I/O requests stored within the request/reply buffer 105. Communication between remote computers and the disk drive, translation of I/O requests into internal I/O commands, and management of the I/O queue, among other things, are carried out by the disk drive I/O controller as specified by disk drive I/O controller firmware 107. Translation of internal I/O commands into electromechanical disk operations in which data is stored onto, or retrieved from, the disk platters 104 is carried out by the disk drive I/O controller as specified by disk media read/write management firmware 108. Thus, the disk drive I/O control firmware 107 and the disk media read/write management firmware 108, along with the processors and memory that enable execution of the firmware, compose the disk drive controller.

Individual disk drives, such as the disk drive illustrated in FIG. 1, are normally connected to, and used by, a single remote computer, although it has been common to provide dual-ported disk drives for use by two remote computers and multi-port disk drives that can be accessed by numerous remote computers via a communications medium such as a fibre channel. However, the amount of electronic data that can be stored in a single disk drive is limited. In order to provide much larger-capacity electronic data storage devices that can be efficiently accessed by numerous remote computers, disk manufacturers commonly combine many different individual disk drives, such as the disk drive illustrated in FIG. 1, into a disk array device, increasing both the storage capacity as well as increasing the capacity for parallel I/O request servicing by concurrent operation of the multiple disk drives contained within the disk array.

FIG. 2 is a simple block diagram of a disk array. The disk array 202 includes a number of disk drive devices 203, 204, and 205. In FIG. 2, for simplicity of illustration, only three individual disk drives are shown within the disk array, but disk arrays may contain many tens or hundreds of individual disk drives. A disk array contains a disk array controller 206 and cache memory 207. Generally, data retrieved from disk drives in response to READ requests may be stored within the cache memory 207 so that subsequent requests for the same data can be more quickly satisfied by reading the data from the quickly accessible cache memory rather than from the much slower electromechanical disk drives. Various elaborate mechanisms are employed to maintain, within the cache memory 207, data that has the greatest chance of being subsequently re-requested within a reasonable amount of time. The disk array controller 206 may also elect to store data received from remote computers via WRITE requests in cache memory 207 in the event that the data may be subsequently requested via READ requests or in order to defer slower writing of the data to physical storage media.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters, including access privileges, backup frequencies, and mirror coordination with one or more LUNs. Remote computers generally access data within a disk array through one of the many abstract LUNs 208–215 provided by the disk array via internal disk drives 203–205 and the disk array controller 206. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies logical unit, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

The disk array controller fields I/O requests from numerous remote computers, queues the incoming I/O requests, and then services the I/O requests in as efficient a manner as possible. Many complex strategies for I/O request servicing are employed, including strategies for selecting queued requests for servicing in an order that optimizes parallel servicing of requests by the many internal disk drives. In similar fashion, individual disk drive controllers employ various strategies for servicing I/O requests directed to the disk drive, including reordering received requests in order to minimize the relatively slow electromechanical seeking operations required to position the read/write heads at different radial distances from the center of the disk platters.

The present invention is related to a somewhat higher-level optimization with regard to I/O request servicing. The disk array has no control over the order and timing of I/O requests received from the numerous remote computers that concurrently access the disk array. However, the disk array controller must attempt to service incoming I/O requests in such a way as to guarantee a maximum response time to requesting remote computers as well as to guarantee servicing of some minimum number of I/O requests per unit of time. Many types of application programs running on remote computers, including applications that display or broadcast streaming video or audio data, require that the data be received reliably at specified data transfer rates without interruptions in the flow of data greater than specified maximum interruptions times.

In FIGS. 3–5, referenced in this section, and in FIG. 6, referenced in the Detailed Description of the Invention section that follows, time-dependent servicing of I/O requests by a disk array controller is illustrated for three remote computers, "h1," "h2," and "h3," and the disk array, "a." In FIGS. 3–6, I/O request servicing is plotted along a horizontal timeline, and all four figures employ similar illustration conventions.

FIG. 3 illustrates a short time slice of desirable I/O request servicing by a disk array controller on behalf of three remote computers. In FIG. 3, and FIGS. 4–6 that follow, the horizontal axis 301 is a timeline, and I/O request servicing on behalf of remote computer "h3" is shown along horizontal line 302, I/O request servicing on behalf of remote computer "h2" is shown along horizontal line 303, I/O request servicing on behalf of remote computer "h1" is shown along horizontal line 304, and overall I/O request servicing by the disk array controller and internal disk drives is shown along the timeline 301. For the sake of simplicity, I/O request servicing is shown in FIGS. 3–6 as of either short duration, such as I/O request servicing represented by block 305 in FIG. 3, or of long duration, as, for example, I/O request servicing represented by block 306 in FIG. 3. Short-duration I/O request servicing corresponds to reading or writing data to the memory cache (207 in FIG. 2) and long-duration I/O request servicing corresponds to immediate reading data from, or writing data to, internal disk drives.

In FIG. 3, the large block of I/O request servicing 307 by the disk array controller comprises servicing of the individual I/O requests represented by blocks 308–311 on behalf of remote computer "h1," blocks 305, 312, and 313 on behalf of remote computer "h2," and blocks 306 and 314 on behalf of remote computer "h3." For additional simplicity of illustration, it is assumed, in the examples illustrated in FIGS. 3–6, that the disk array controller can service only one I/O request at any given time. As noted above, disk array controllers can normally concurrently service hundreds or thousands of I/O requests, but the principles illustrated in FIGS. 3–6 apply to any fixed limit or capacity for concurrently servicing I/O requests, and since it is easier to illustrate the case of the disk array controller having the capacity to service only 1 I/O request at a time, that case is assumed in FIGS. 3–6. FIG. 3 illustrates a desirable I/O request servicing behavior in which I/O request servicing is fairly distributed between servicing of I/O requests for all three remote computers "h1," "h2," and "h3." Such desirable I/O request servicing occurs when, for example, I/O requests are generated in time in a statistically well-distributed manner among the remote computers and no remote computer generates more than some maximum number of I/O requests per unit of time that can be serviced by the disk array controller using some fraction of the disk array controller's I/O request servicing capacity small enough to insure that sufficient capacity remains to concurrently service the I/O requests generated by the other remote computers accessing the disk array.

Unfortunately, the fortuitous desirable behavior illustrated in FIG. 3 may quickly degenerate into undesirable patterns of I/O request servicing due, in part, to high levels of I/O requests generated by one or more remote computers. FIG. 4 illustrates a short time slice of undesirable I/O request servicing behavior. In FIG. 4, remote computer "h2" is generating the vast bulk of I/O requests at the apparent expense of servicing of I/O requests for remote computers "h1" and "h3." Note that the disk array "a" is servicing I/O requests at nearly full capacity, represented in FIG. 4 by the large blocks 401 and 402 of I/O request servicing activity. In the time slice illustrated in FIG. 4, the disk array controller services fourteen I/O requests on behalf of remote computer "h2," while servicing only three I/O requests on behalf of each of remote computers "h1" and "h3." Assuming that remote computers "h1" and "h3" have made additional I/O requests in the time slice illustrated in FIG. 4, the disk array is servicing I/O requests preferentially on behalf of remote computer "h2" at the expense of remote computers "h1" and "h3."

This undesirable I/O request servicing behavior may arise for many different reasons. Remote computer "h2" may be faster than the other remote computers, and may therefore generate requests at a higher rate. Alternatively, remote computer "h2" may, for some reason, have faster communications access to the disk array than either of the other remote computers. As a third alternative, the I/O requests from all three remote computers may arrive at the disk array at generally equivalent rates, but either by chance or due to peculiarities of input queue processing by the disk array controller, the disk array controller may end up processing, at least during the time slice illustrated in FIG. 4, I/O requests on behalf of remote computer "h2" at a higher rate than it services I/O requests on behalf of the other remote computers.

FIG. 5 illustrates a simple throttling methodology that can be applied by the disk array controller to prevent one or some small number of remote computers from monopolizing I/O request servicing by the disk array controller. To practice this methodology, the disk array controller divides the timeline of I/O request servicing into discrete intervals, indicated in FIG. 5 by the vertical axis 501 and evenly spaced vertical dashed lines 502–506. The timeline shown in FIG. 5 starts at time t=0 and includes 6 discrete subintervals, the first subinterval spanning I/O request servicing between time t=0 and time t=1, the second subinterval spanning I/O request servicing between time t=1 and time t=2, and so on. In order to prevent monopolization of I/O request servicing by one or a few remote computers, the disk array controller services up to some maximum number of I/O requests for each remote computer during each subinterval. In the example illustrated in FIG. 5, the disk array controller services up to one I/O request for each of remote computers "h1" and "h3" during each subinterval, and services up to two I/O requests during each subinterval for remote computer "h2." Thus, remote computer "h2" receives I/O request servicing from the disk array at up to two I/O requests per subinterval. If the subintervals represent 100 milliseconds, then remote computer "h2" can receive servicing from the disk array controller of up to twenty I/O requests per second. Of course, if a remote computer generates fewer I/O requests per second than the maximum number of I/O requests that the disk array controller can service for that remote computer, the remote computer will receive less than the maximum number of I/O requests per second. The disk array controller may contract with remote computers for a specified maximum rate of I/O request servicing, as shown in FIG. 5, or may alternatively provide each remote computer accessing the disk array with some maximum rate of I/O request servicing calculated to ensure adequate response times to all remote computers while optimizing the I/O request servicing load of the disk array.

The simple scheme of providing servicing of up to a maximum number of I/O requests per unit of time to remote computers can be used to prevent monopolization of I/O request servicing by one or a small number of remote computers, as illustrated in FIG. 4. However, this simple scheme may introduce inefficient and non-optimal operation of the disk array and disk array controller. In FIG. 5, each block of I/O request servicing, such as block 507, is labeled with the time at which the disk array controller receives the I/O request from the requesting remote computer. For example, the I/O request that initiated I/O request servicing presented by block 507 in FIG. 5 was received by the disk array controller at time t=2.1. However, servicing of this I/O request was delayed, as indicated in FIG. 5 by the position of the leading edge of block 507 at approximately time t=2.5, because the disk array controller was occupied with servicing of the I/O request represented by block 508 on behalf of remote computer "h2." Note, again, that in the very simplified examples illustrated in FIGS. 3–6, it is assumed that the disk array controller can service only one I/O request at any particular time. However, as noted earlier, disk array controllers can normally process a great number of I/O requests simultaneously by distributing them among internal disk drives for parallel execution. However, the principle of I/O request servicing throttling is applicable regardless of the number of I/O requests that can be serviced concurrently by a disk array, and, since it is easier to illustrate the case in which the disk array can only handle one I/O request at a time, that minimal case is illustrated in FIGS. 3–6.

The major problem with the simple throttling scheme illustrated in FIG. 5 is that it can lead to blocking situations in which the disk array has I/O request servicing capacity that cannot be employed because of enforcement of throttling, although I/O requests are outstanding. This problem is illustrated in FIG. 5 in time subintervals 5 and 6. The disk array controller receives I/O requests from remote computer "h2" at times t=4.0, t=4.1, t=4.2, and t=4.4. The disk array controller also received an I/O request from remote computer "h3" at time t=4.0. In this example, no previously received I/O requests are outstanding. The disk array controller first services the I/O request received from remote computer "h2" at time t=4.0, represented in FIG. 5 as block 509, next services the I/O request received from remote computer "h3" received at time t=4.0, represented in FIG. 5 as block 510, and the services the I/O request received from remote computer "h2" at time t=4.1, represented in FIG. 5 as block 511. At the point in time when the disk array controller completes servicing of the I/O request presented by block 511, t=4.5, the disk array controller has already received two additional I/O requests from remote computer "h2." However, the disk array controller has, in subinterval 5, serviced the maximum number of I/O requests allotted to remote computer "h2." Therefore, the disk array controller may not begin servicing these additional I/O requests until time t=5.0, the start of the next subinterval. Unfortunately, at time t=4.5, the disk array controller has no other outstanding I/O requests. Therefore, as indicated in FIG. 5 by the lack of I/O request servicing between times t=4.5 and time t=5.0, the disk array controller is temporarily stalled, although it has capacity for servicing I/O requests and has outstanding I/O requests to service. Repercussions of this temporary stall can be seen in subinterval 6 in FIG. 5. At times t=5.0 and t=5.1, the disk array controller receives I/O requests from remote computers "h1" and "h3," respectively. However, the disk array controller must first service the outstanding I/O requests received from remote computer "h2," represented in FIG. 5 by blocks 513 and 514. Thus, servicing of the requests received at time t=5.0 and time t=5.1 is delayed unnecessarily, since the I/O requests received from remote computer "h2" could have been serviced between time t=4.5 and time t=5.0 but for enforcement of the throttling scheme by the disk array controller.

Manufacturers of disk array controllers, providers of network-based data storage, data intensive application program designers, and computer services end users have recognized the need for a better methodology for preventing monopolization by one or a few remote computers of servicing of I/O requests by disk arrays while, at the same time, providing more optimal I/O request servicing by disk array controllers.

SUMMARY OF THE INVENTION

A sliding window throttling methodology may be employed by storage device controllers to prevent monopolization of I/O request servicing by storage device controllers for remote computers that elect a premium tier of servicing from the disk storage device. Otherwise, a simple maximum rate of I/O request servicing throttling technique is used as part of a basic tier of servicing. In accordance with the sliding window methodology, the storage device controller maintains an approximate instantaneous rate of I/O request servicing for each remote computer accessing the storage device based on a recent history of I/O request servicing by the storage device on behalf of each remote computer. The recent history extends back in time for some relatively short, fixed interval from the current time. When the instantaneous rate of I/O request servicing for a particular remote computer falls below the contracted-for maximum rate of I/O request servicing for that remote computer, the storage device controller decreases the interval between servicing of I/O requests on behalf of the remote computer in order to push the maximum possible rate of I/O request servicing higher than the contracted-for rate so that the overall time-averaged rate of I/O request servicing is raised upward toward the contracted-for rate. Conversely, when the instantaneous rate of I/O request servicing for a particular remote computer rises above the contracted-for maximum rate of I/O request servicing for that remote computer, the storage device controller increases the interval between servicing of I/O requests on behalf of the remote computer in order to lower the maximum possible rate of I/O request servicing below the contracted-for rate so that the overall time-averaged rate of I/O request servicing is lowered toward the contracted-for rate.

DETAILED DESCRIPTION OF THE INVENTION

The present invention relates to throttling, by a disk array controller, of I/O request servicing on behalf of any given remote computer generating I/O requests in order to prevent monopolization of I/O request servicing by the given remote computer and to fairly distribute I/O request servicing by the disk array among all remote computers accessing the disk array. As discussed above, a simple scheme by which a disk array controller provides to any given remote computer servicing up to some maximum number of I/O requests per unit of time can effectively prevent monopolization of I/O request servicing by a remote computer, or a small number of remote computers, at the expense of other remote computers, but may introduce inefficiencies and sub-optimal I/O request servicing with respect to the disk array controller.

Figure 1:
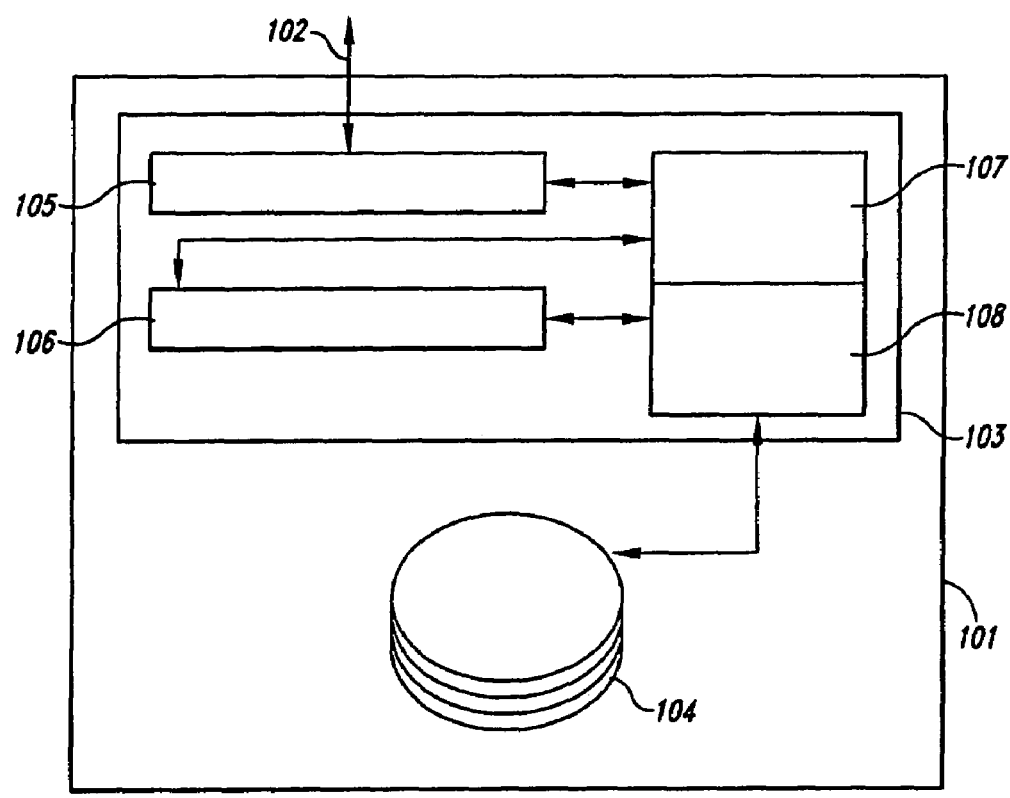
FIG. 1 is a block diagram of a standard disk drive.
Figure 2:
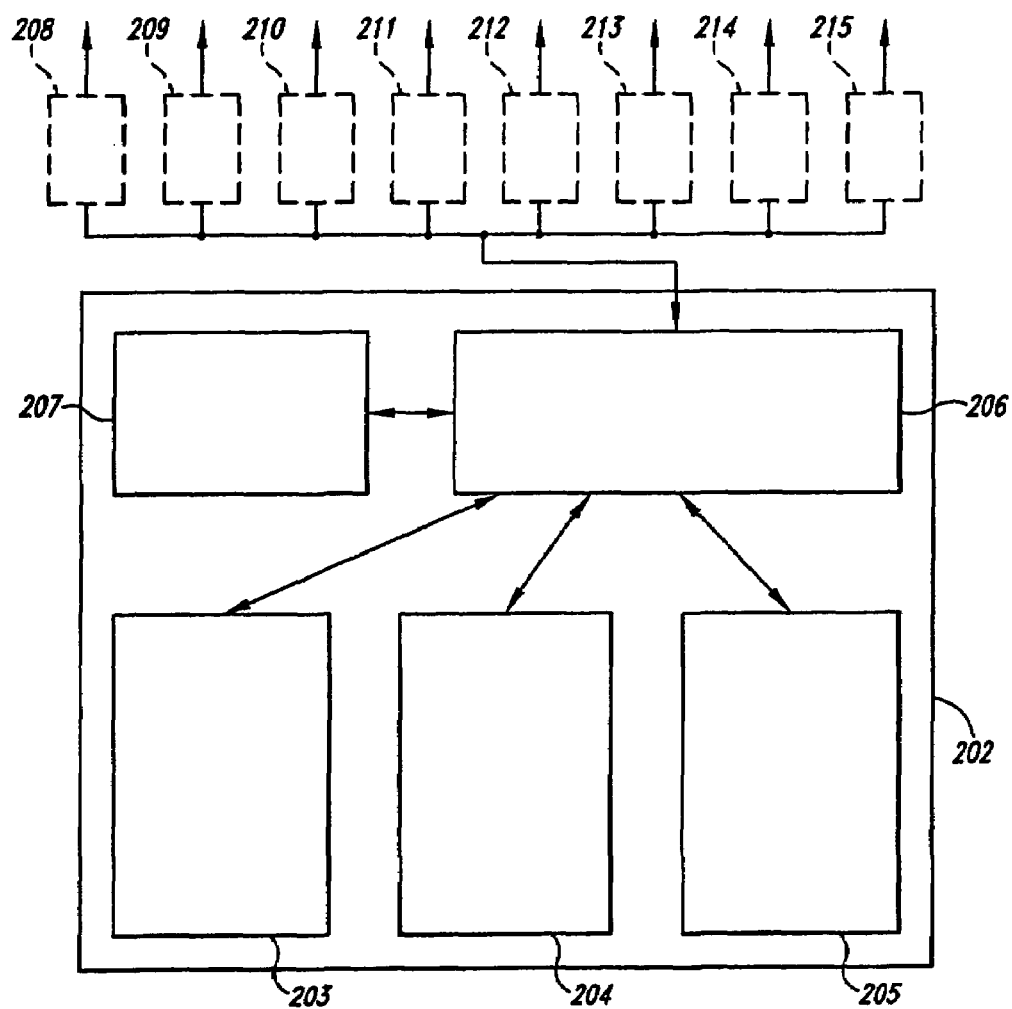
FIG. 2 is a simple block diagram of a disk array.
Figure 3:
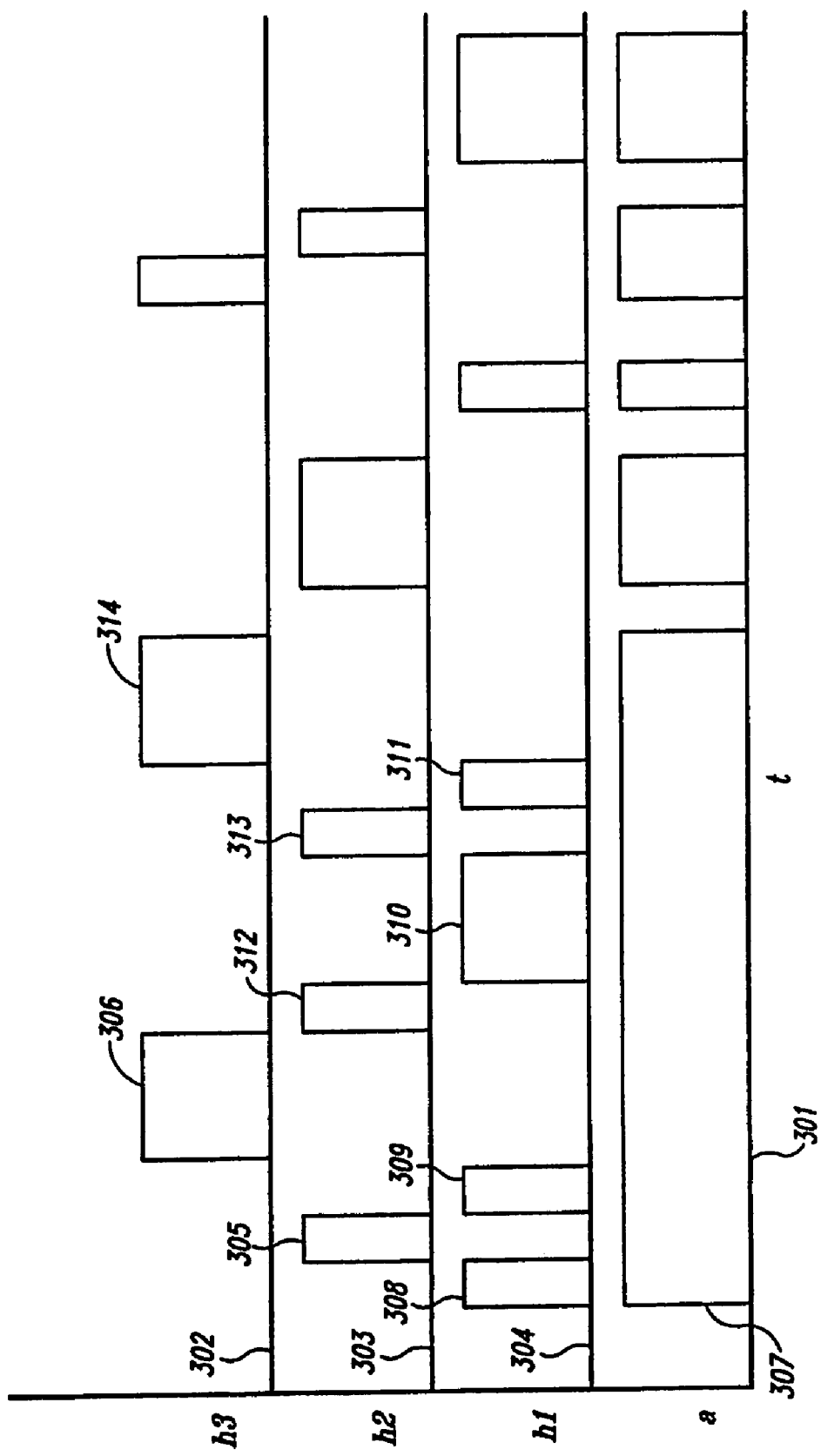
FIG. 3 illustrates a short time slice of desirable I/O request servicing by a disk array on behalf of three remote computers.
Figure 4:
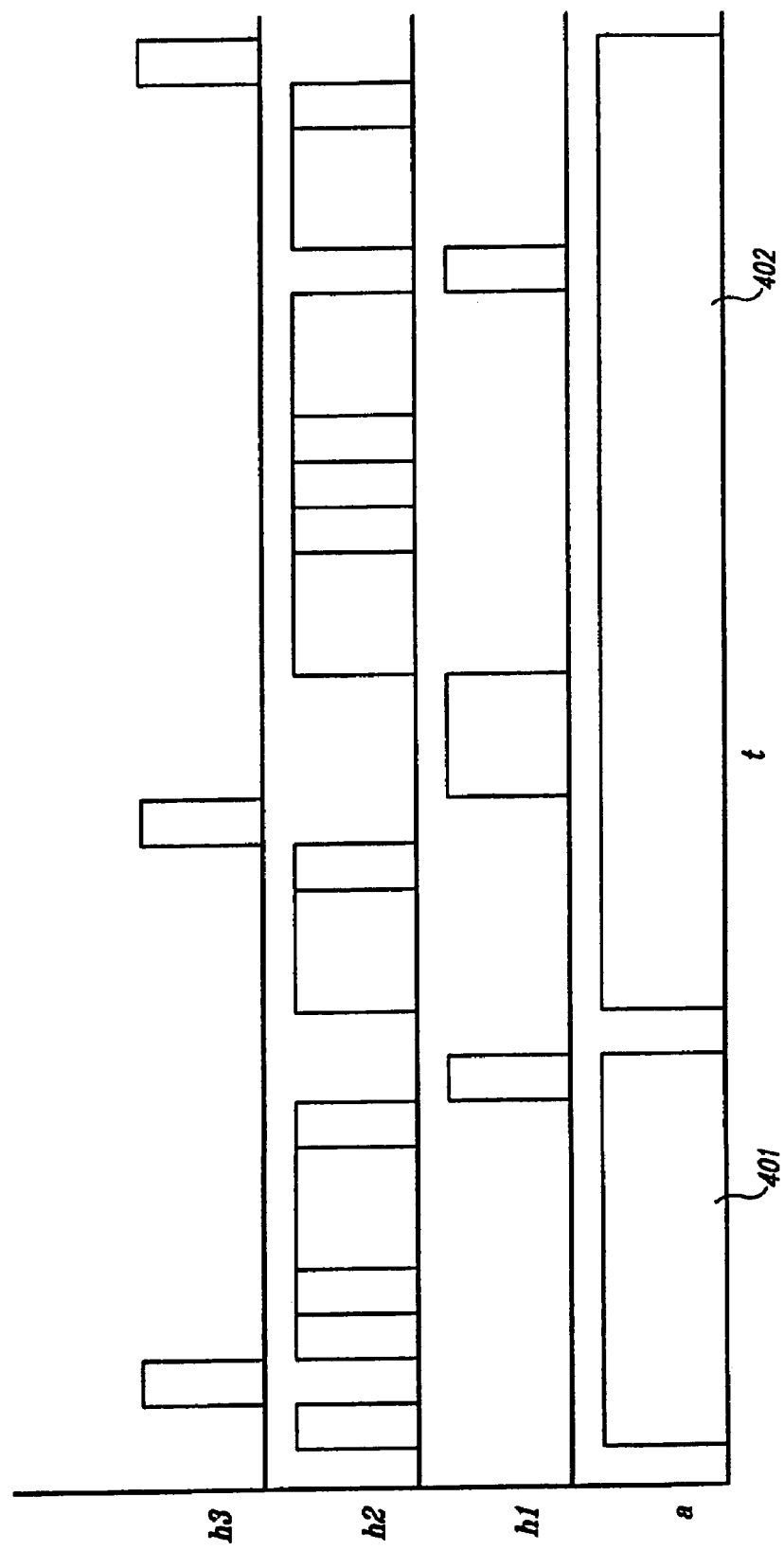
FIG. 4 illustrates a short time slice of undesirable I/O request servicing behavior.
Figure 5:
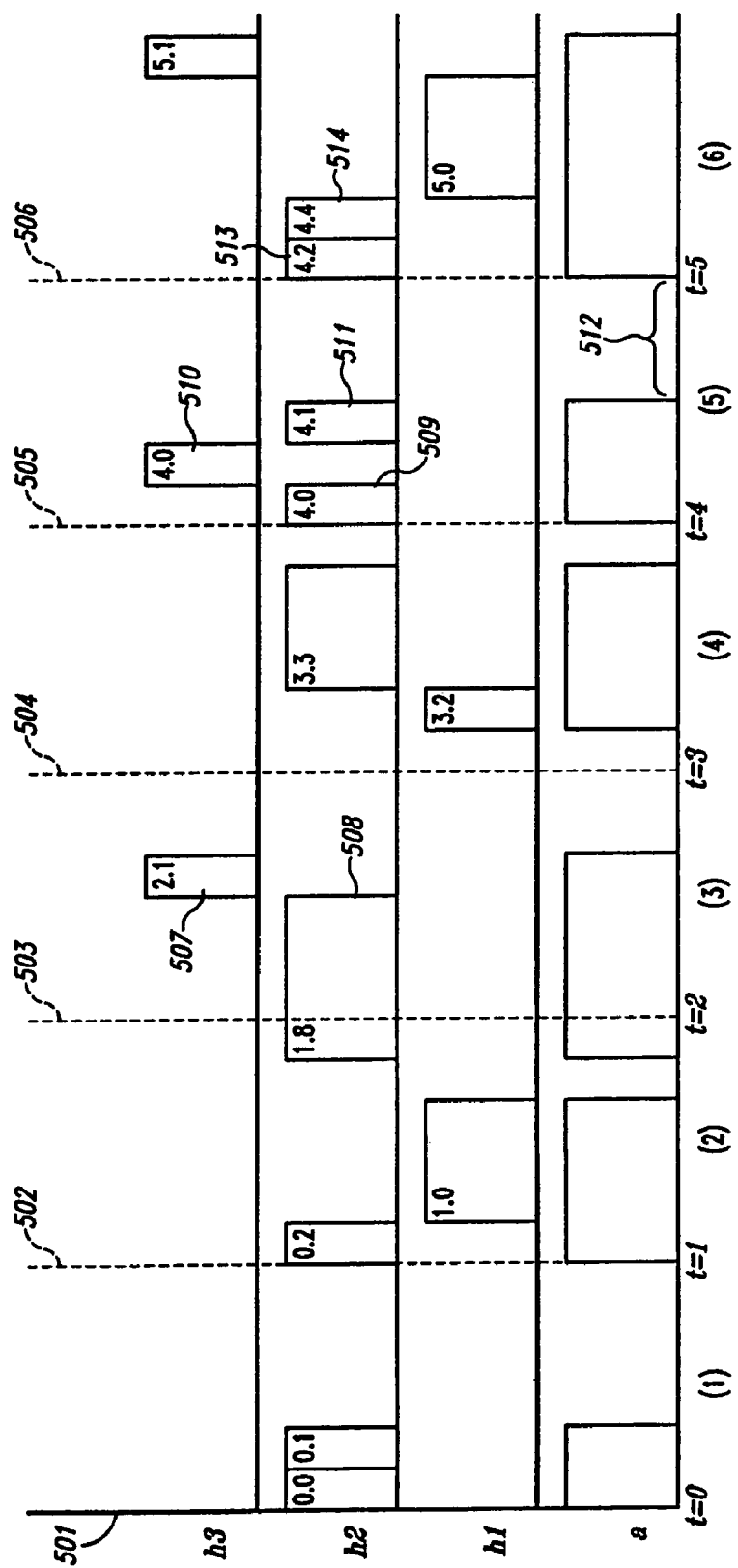
FIG. 5 illustrates a simple throttling methodology that can be applied by a disk array controller to prevent one or some small number of remote computers from monopolizing I/O request servicing by the disk array controller.

Analysis of FIG. 5 reveals a second disadvantage of the simple throttling scheme. Not only is I/O request servicing capacity squandered due to enforcement of throttling when I/O requests are pending from the throttled remote computer and no other I/O requests are pending, as illustrated in FIG. 5, but the throttled remote computer in fact, over time, may receive servicing of substantially less than the maximum number of I/O requests per unit time than the remote computer contracted for. For example, if the subintervals in FIG. 5 represent 100 milliseconds, then the I/O requests serviced per second on behalf of remote computer "h2" as of subinterval 6 is $9/600$ milliseconds or 15 I/O requests per second. However, remote computer "h2," as noted above, has contracted to receive servicing of up to 20 I/O requests per second. Had servicing of the I/O requests received by the disk array from remote computer "h2" at times t=4.2 and t=4.4 been permitted in the interval between times t=4.5 and t=5.0, then at the end of time subinterval 5, remote computer "h2" would have received servicing of I/O requests at a rate of 18 I/O requests per second, still below, but closer to the contracted maximum rate of I/O request servicing.

In one embodiment of the present invention, the disk array controller periodically calculates and maintains an approximate instantaneous rate of I/O request servicing for each remote computer contracting for a premium tier of service with respect to a particular LUN. This instantaneous rate of I/O request servicing is calculated based on a recent history of I/O request servicing for the remote computer with respect to the LUN. As time progresses, the approximate instantaneous rate of I/O request servicing is recalculated at regular intervals, so that the interval of time representing the recent history from which the calculation of the instantaneous rate of I/O request servicing is calculated can be thought of as sliding forward in time. Hence, this approach can be thought of as a "sliding window" method for monitoring the rate of I/O request servicing received by a remote computer with respect to a particular LUN, and for adjusting subsequent rates of I/O request servicing for the remote computer with respect to the LUN in order to provide, over long periods of time, the maximum rate of I/O request servicing that the remote computer contracted for with respect to the LUN.

Figure 6:
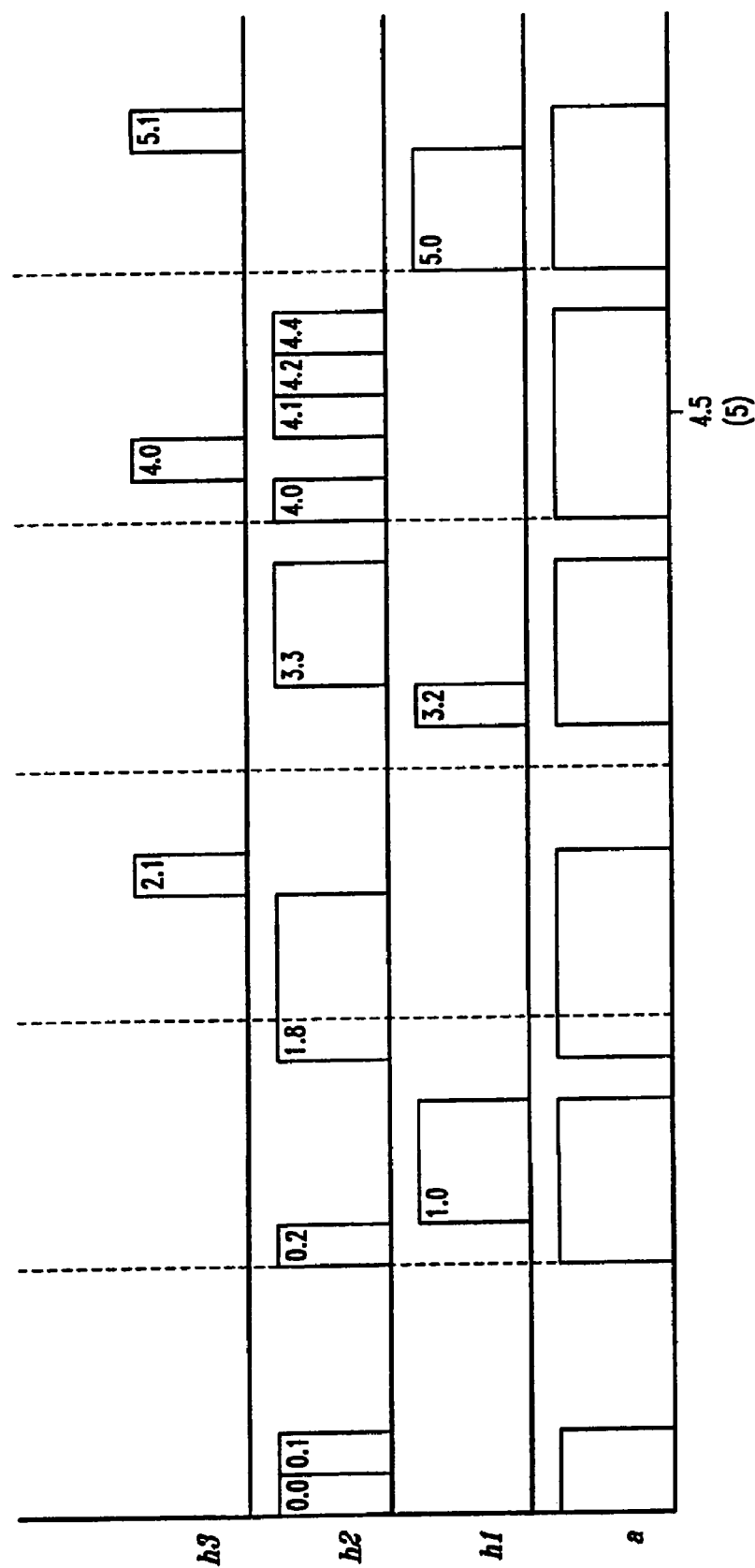
FIG. 6 illustrates I/O request servicing under the same scenario as illustrated in FIG. 5 using the sliding window throttling scheme that represents one embodiment of the present invention.

FIG. 6 illustrates I/O request servicing under the same scenario as illustrated in FIG. 5 using the sliding window throttling scheme. In FIG. 6, the disk array controller determines, at time t=4.5, that during the current and previous subintervals illustrated in FIG. 6, that remote computer "h2" is currently receiving servicing of I/O requests at a rate of about 14 I/O requests per second. Comparing this rate with the maximum rate of I/O request servicing, 20 I/O requests per second, contracted for by remote computer "h2," the disk array controller determines that it can relax, or adjust, the short term throttling of I/O request servicing on behalf of remote computer "h2" in order to compensate remote computer "h2" for the current lower-than-contracted-for rate of I/O request servicing based on the recent history of I/O request servicing on behalf of remote computer "h2." Thus, instead of restricting servicing of I/O requests on behalf of remote computer "h2" in subinterval 5 to 2 I/O requests, as in FIG. 5, the disk array controller, under the sliding window-throttling scheme, continues to process I/O requests on behalf of remote computer "h2" during subinterval 5 at a temporarily greater-than-contracted-for rate. Because the disk array controller periodically recalculates the approximate instantaneous rate of I/O request servicing for each remote computer with respect to each LUN, the disk array controller can later decrease the rate at which it services I/O requests on behalf of remote computer "h2" should the calculated instantaneous rate rise above the maximum rate of 20 I/O requests per second contracted for by remote computer "h2."

In summary, each remote computer contracts with the disk array for a maximum rate of processing or servicing of I/O requests per second with respect to each LUN accessed by the remote computer. If the remote computer contracts for a premium service, the disk array controller maintains, and periodically recalculates, an approximate instantaneous rate of I/O request servicing for each remote computer with respect to each LUN accessed by the remote computer. If, because of variations in the rate at which a remote computer generates I/O requests, the instantaneous rate of I/O request servicing falls below the maximum rate of I/O request servicing contracted for by the remote computer with respect to a particular LUN, the disk array controller will temporarily increase the rate at which it services I/O requests on behalf of the remote computer with respect to the LUN so that subsequent instantaneous rates of I/O request servicing calculated for the remote computer with respect to the LUN approach the maximum contracted for rate. In other words, the disk array controller may vary the rate at which it services I/O requests on behalf of a remote computer with respect to a particular LUN above or below the contracted-for rate at different points in time so that the overall, time-averaged rate of I/O request servicing approaches the contracted-for rate. If the remote computer contracts for a basic service, then the disk array controller limits the rate of I/O request servicing to the maximum rate, regardless of the recent history of I/O request servicing. When generation of I/O requests by the remote computer is unevenly distributed in time, the remote computer may receive substantially less than the maximum rate of I/O request servicing, as illustrated in FIG. 5.

Figure 7:
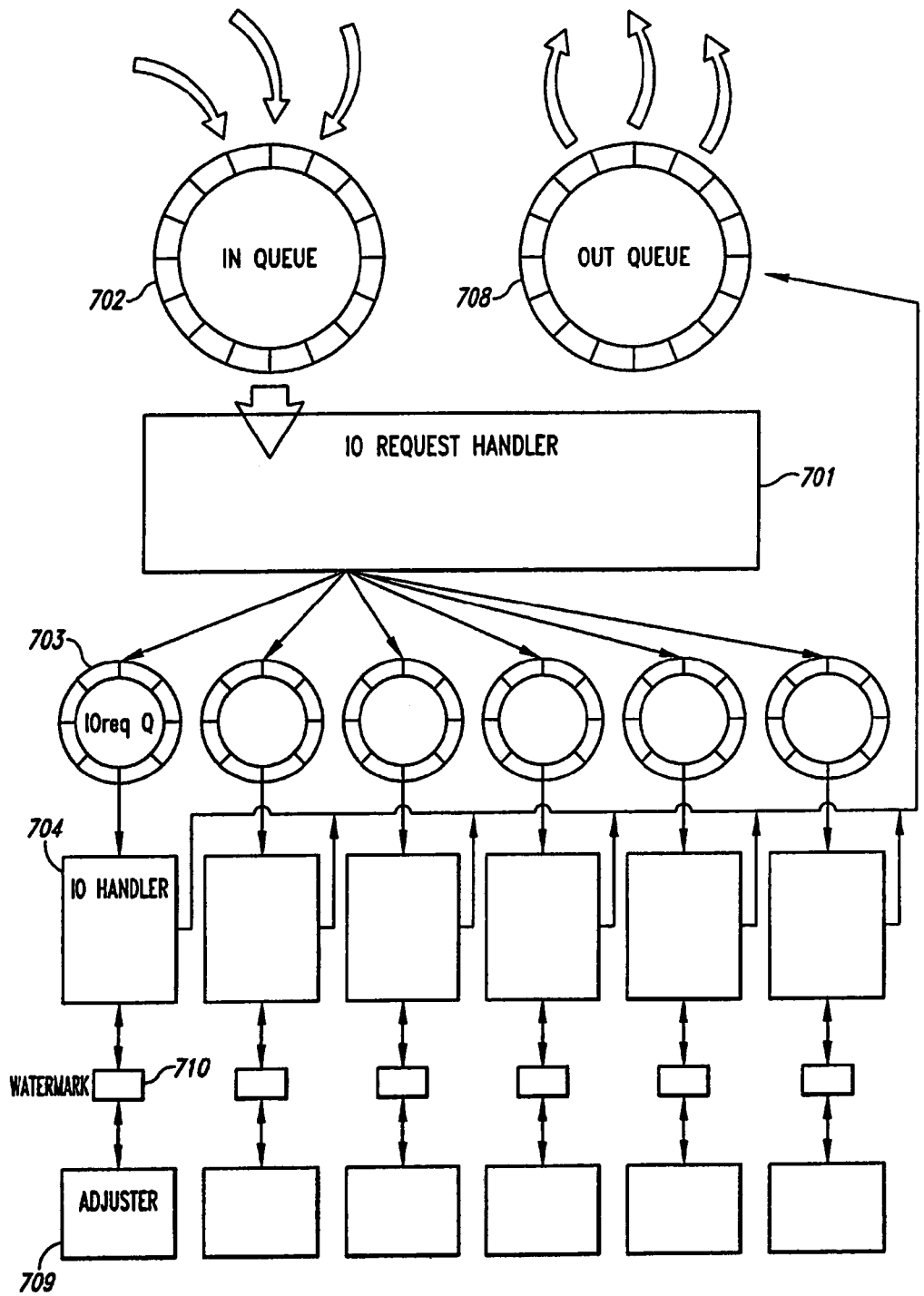
FIG. 7 illustrates organization and particular features of the C++-like pseudocode used to illustrate one embodiment of the present invention.

This embodiment of the present invention is described below in simple C++-like pseudocode. FIG. 7 illustrates the overall organization and particular features of this C++-like pseudocode. The C++-like pseudocode includes three main routines. The routine "IORequestHandler" represents high-level processing by the disk array controller. This routine receives I/O requests from remote computers via an inbound queue "inQueue" 702 and distributes received I/O requests to intermediary queues, called "IOreqQs" (for example. IOreqQ 703 in FIG. 7) associated with each unique remote computer/LUN pair. For each remote computer/LUN pair, a separate, asynchronously executing thread executes the routine "IOHandler" (for example, IOhandler thread 704 in FIG. 7) that receives I/O requests from the intermediary queue associated with the thread, processes the I/O requests, and returns status and, in the case of a READ request, data to an outgoing queue "outQueue" 708. For each separate, concurrently executing thread executing the routine "IOHandler" there is an additional thread executing the routine "adjuster" (for example, adjuster thread 709 in FIG. 7). The associated I/O handler and adjuster routines share access to an integer "watermark" (for example, watermark 710 in FIG. 7) that represents the approximate instant I/O request servicing rate for the remote computer/LUN pair associated with the I/O handler routine and adjuster routine. When the I/O handler routine services an I/O request, the I/O handler routine adjusts the watermark upward, and the associated adjuster routine periodically adjusts the watermark downward.

Note that the following C++-like psuedocode does not attempt to illustrate or describe all the various functionality of a disk array controller, but only that functionality related to the sliding window throttling mechanism that represents a component of one embodiment of the present invention. First, a number of enumerations, constants, and classes are provided to represent basic entities handled and employed by the disk array controller:

```
1   enum price {BASIC, PREMIUM};
2   enum IOCommand {READ, WRITE};
3   const int MAX_DELAY = 4;
4   const int NULL = 0;
1   class time
2   {
3   public:
4       int operator-(time);
5   };
```

```
1   class hostID
2   {
3
4   };
1   class IOaddress
2   {
3
4   };
1   class buffAddress
2   {
3
4   };
1   class IOrequest
2   {
3   public:
4       hostID* getHostID( );
5       int getLUN( );
6       IOCommand getIOCommand( );
7       IOaddress getIOaddress( );
8       buffAddress getBuffAddress( );
9       int getLength( );
10
11  };
1   class completedIO
2   {
3   public:
4       void     setHostID(hosted* hd);
5   };
1   class IORequestQueue
2   {
3   public:
4       IOrequest*  getNext( );
5       void        queue(IOrequest*);
6       hostID      getHeadHost( );
7       bool        empty( );
8       bool        terminated( );
9       void        terminate( );
10  };
1   class IORequestQueueArray
2   {
3   public:
4       IORequestQueue* getQ(hostID*, int);
5   };
1   class completedIOQueue
2   {
3   public:
4       void    queue(completedIO*);
5       bool    terminated( );
6   };
1   class IOService
2   {
3   public:
4       hostID*  getHost( );
5       int      getLUN( );
6       price    getPricing( );
7       int      getMaxIOPS( );
8       int      getWatermark( );
9       void     setWatermark(int);
10      void     incWatermark( );
11      void     decWatermark( );
12
13  };
1   class IOServices
2   {
3   public:
4       IOService* getIOService(hostID&, int);
5       IOService* getFirst( );
6       IOService* getNext( );
7   };
```

In the embodiment of the present invention described in the C++-like pseudocode, the remote computer may contract either for basic service, essentially representing the simple throttling mechanism illustrated in FIG. 5 in which the remote computer that unevenly generates I/O requests may receive substantially less than the maximum rate of I/O request servicing, or a premium service in which the remote computer receives a rate of I/O request servicing as close to the maximum contracted-for rate possible using the above-described sliding window throttling mechanism. The enumeration "price" on line 1, above, contains values representing the two pricing tiers available to remote computers, namely "BASIC" representing I/O request servicing according to the simplified throttling mechanism, and "PREMIUM" representing I/O request servicing according to the sliding window throttling mechanism. The values of the enumeration "IOCommand" on line 2 represent the basic I/O commands READ and WRITE. The constant "MAX_DELAY," declared on line 3, is a maximum limit to a decrease in the instantaneous rate of I/O request servicing that the disk array controller may apply. Finally, the constant "NULL" is defined to indicate null pointers.

Next, in the above C++-like pseudocode, a number of classes are defined. Many of these classes contain no member functions, because no additional detail is necessary for the subsequent routine descriptions. In essence, they are stubs, or place holders, representing additional potential functionality that is unnecessary for description of the present invention. Other of the classes contain minimal member functions sufficient for description of the present invention. Note, however, that the C++-like pseudocode used to describe the present invention can be easily transformed into working C++ code by including member functions not provided in the C++-like pseudocode and by implementing the member functions. In the C++-like pseudocode, implementations of routines are only provided when necessary to describe the present invention.

An instance of the class "hostID" represents a unique identifier and address for a remote computer. An instance of the class "IOaddress" represents the address of electronic data specified in an I/O request for READ or WRITE access. The class "buffAddress" represents the address of a buffer that stores electronic data for transfer between remote computers and the disk array controller. The class "IOrequest" encapsulates the various data that together compose an I/O request received from a remote computer that is serviced by the disk array controller. The class "IOrequest" includes the following member functions: (1) "getHostID," a function that returns a pointer to an object of the class "HostID" that represents the remote computer that generated the I/O request represented by the current instance of the class "IOrequest;" (2) "getLUN," a member function that returns the LUN to which the I/O request is addressed; (3) "getIOCommand," a member function that returns one of the values enumerated in the enumeration "IOCommand" indicating the nature of the I/O request; (4) "getIOaddress," a member function that returns the address of the first electronic data to which the I/O request is targeted; (5) "getBuffAddress," a member function that returns the address of the buffer that contains data for a WRITE operation or into which data is placed for a READ operation; and (6) "getLength," a member function that returns the length, or number of contiguous bytes, words, or blocks of data to be read or written during servicing of the I/O request.

An instance of the class "completedIO" includes the status and other data returned to a remote computer upon completion of servicing of an I/O request. In a full implementation, this class requires member functions for setting and getting an I/O address, an I/O buffer address, and other such information included in the previously described class "IOrequest." The single member function "setHostID" shown above allows the disk array controller to set an indication of the remote computer to which the current instance of the class "completedIO" is directed so that the status and other data can be returned to the remote computer via a communications medium.

An instance of the class "IORequestQueue" serves as the in Queue (702 in FIG. 7). The class "IORequestQueue" contains the following member functions: (1) "getNext," a member function that dequeues and returns a pointer to the next I/O request on the queue; (2) "queue," a member function that queues an I/O request, pointed to by the single argument, to the queue; (3) "getHeadHost," a member function that returns the hostID from the next I/O request within the queue to be dequeued from the I/O request queue; (4) "empty," a member function that returns a Boolean value indicating whether or not the I/O request queue is empty; (5) "terminated," a member function that returns a Boolean value indicating whether or not the I/O request queue has been terminated, or shut down; and (6) "terminate," a member function that shuts down, or terminates, the I/O request queue.

An instance of the class "IORequestQueueArray" maintains a buffer of instances of the class "IORequestQueue" described above. These instances of the class "IORequestQueue" correspond to the IOreqQs (for example, IoreqQ 703 in FIG. 7) associated with threads executing the routine "IOHandler."

An instance of the class "completedIOQueue" is employed as the outQueue (708 in FIG. 7). The class "completedIOQueue" includes the member functions: (1) "queue," a member function that queues a completed I/O object pointed to by the single argument to the queue; and (2) "terminated," a member function that returns a Boolean value indicating whether or not the instance of the class "completedIOQueue" has been shut down, or terminated.

An instance of the class "IOService" represents a remote computer/LUN pair, including the pricing tier and maximum number of I/O requests serviced per minute contracted for by the remote computer with respect to the LUN. The disk array controller initializes and maintains an instance of the class "IOServices" for each remote computer/LUN pair serviced by the disk array. The class "IOService" includes the following member functions: (1) "getHost," a member function that returns a pointer to the hostID of the remote computer; (2) "getLUN," a member function that returns the LUN; (3) "getPricing," a member function that returns either the value "BASIC" or the value "PREMIUM" indicating whether simple throttling or sliding window throttling will be used for servicing I/O requests for this remote computer/LUN pair; (4) "getMaxIOPS," a member function that returns the maximum rate of servicing of I/O requests per second contracted for by the remote computer; (5) "getWatermark," a member function that returns the approximate instantaneous rate of servicing of I/O requests for the remote computer/LUN pair; (6) "setWatermark," a member function that allows the instantaneous rate of I/O request servicing to be set to a supplied value; and (7) "incWatermark" and "decWatermark," member functions that allow the instantaneous rate of I/O request servicing to the remote computer/LUN pair to be incremented and decremented, respectively.

Finally, the class "IOServices" is a container for instances of the class "IOService," described above. The class "IOServices" contains the following member functions: (1) "getIOService," a member function that returns the instance of the class "IOService" corresponding to the remote computer and LUN specified as the two supplied arguments; (2) "getFirst," a member function that returns the first instance of the class "IOService" contained in the container represented by the class "IOServices;" and (3) "getNext," a member function that returns successive instances of the class "IOService" contained in the container represented by the class "IOServices."

The routine "IORequestHandler" (701 in FIG. 7) represents high-level processing carried out by the disk array controller in order to implement one embodiment of the present invention:

```
1  void    IORequestHandler (IORequestQueue* inQueue,
2                            completed IOQueue* outQueue,
3                            IOServices* services)
4  {
5       IOrequest*            iorequest;
6       hostID*               hd;
7       int                   LUN;
8       IOService             service;
9       IORequestQueueArray   IOReqQs;
10      initialize(inQueue, outQueue, services);
11      service = services->getFirst( );
12      while (service != NULL)
13      {
14          hd = service->getHost( );
15          LUN = service->getLUN( );
16          systemStartThread(IOhandler, service,
17                            IOReqQs.getQ(hd, LUN), outQueue);
18          service = services->getNext( );
19      }
20      while (!inQueue->terminated( ) &&
               !outQueue->terminated( ))
21      {
22          if (inQueue->empty( ))
                systemWaitOnQueueEvent(inQueue);
23          iorequest = inQueue->getNext( );
24          hd = iorequest->getHostID( );
25          LUN = iorequest->getLUN( );
26          IOReqQs.getQ(hd, LUN)->queue(iorequest);
27      }
28      service = services->getFirst( );
29      hd = service->getHost( );
30      LUN = service->getLUN( );
31      if (!outQueue->terminated( ))
32      {
33          while (service != NULL)
34          {
35              startThread(IOhandler, service,
36                          IOReqQs.getQ(hd, LUN), outQueue);
37              service = services->getNext( );
38              hd = service->getHost( );
39              LUN = service->getLUN( );
40              IOReqQs.getQ(hd, LUN)->terminate( );
41          }
42      }
43  }
```

The routine "IORequestHandler" receives pointers to the in Queue (702 in FIG. 7), the outQueue (708 in FIG. 7), and a container "services" that contains instances of the class "IOService" for each remote computer/LUN pair serviced by the disk array controller. On line 10, IORequestHandler calls a routine "initialize" to carry out any initialization operations on the I/O queues and the services container. These initialization operations are, for the most part, dependent on implementations of other portions of the disk array controller that are beyond the scope of the present invention, and are therefore not described in an implemention the routine "initialize." However, it is important to note that one function of the routine "initialize" is to set the watermark, for each instance of the class "IOServices" contained in the container pointed to by "services," equal to the maximum rate of I/O request servicing contracted for by the remote computer of the remote computer/LUN pair represented by the instance of the class "IOService."

On lines 11–19, IORequestHandler extracts each instance of the class "IOService" from the container pointed to by the pointer "services" in order to start a thread executing the routine "IOHandler" for the remote computer/LUN pair represented by the extracted instance of the class "IOService." Thus, on lines 11–19, IORequestHandler starts execution of a separate instance of the routine "IOHandler" for each remote computer/LUN pair.

The bulk of the processing carried out by IORequest-Handler occurs in the loop comprising lines 20–27. This loop is terminated only when one or both of the in Queue and outQueue (702 and 708 in FIG. 7, respectively) are terminated. On line 22, IORequestHandler checks to see if the in Queue is empty and, if so, calls a system function "system-WaitOnQueueEvent" to wait until the I/O request is queued to the in Queue. Once a next I/O request is available for processing, IORequestHandler dequeues that I/O request from the in Queue and queues the I/O request to the appropriate IOreqQ associated with the remote computer/LUN pair on behalf of which the I/O request will be serviced by an instance of the routine "IOhandler." Thus, the while-loop comprising lines 20–27 serves to distribute I/O requests from the in Queue (702 in FIG. 7) to the various IOreqQ queues (for example, IOreqQ 703 in FIG. 7). Finally, on lines 28–42, once one or both of the in Queue and outQueue are terminated, IORequestHandler terminates all of the IOreqQ queues and thus terminates all of the I/O handler threads launched in the while-loop comprising lines 12–19.

The routine IOhandler carries out I/O request servicing for a particular remote computer/LUN pair. Each remote computer/LUN pair is associated with a separate thread executing the routine "IOhandler" (704 in FIG. 7). A C++-like pseudocode version of the routine "IOhandler" follows:

```
1  void    IOhandler (void* s, void* iQ, void* oQ)
2  {
3       IOService*         service = static_cast<IOService*>(s);
4       IORequestQueue*    IOreqQ = static_cast<IORequestQueue*>(iQ);
5       completedIOQueue*  IOcompQ = static_cast<completedIOQueue*>(oQ);
6       hostID*            hd = service->getHost( );
7       int                LUN = service->getLUN( );
8       int                IOpS = service->getMaxIOPS( );
9       float              reciprocalIOpS = 1/IOpS;
10      int                IOTime = (reciprocalIOpS * 1000);
11      int                elapsedTime;
12      time               initialT;
13      completedIO*       cIO;
14      IOrequest*         iorequest;
15      systemStartThread(adjuster, service);
16      while (!IOreqQ->terminated( ) && !IOcompQ->terminated( ))
```

```
17    {
18        if (IOreqO->empty( )) systemWaitOnQueueEvent(iQ);
19        iorequest = IOreqQ->getNext( );
20        if (iorequest != NULL)
21        {
22            initialT = systemGetTime( );
23            cIO = reinterpret_cast<completedIO*>
24                     (systemIO(iorequest->getIOCommand( ),
25                               iorequest->getIOaddress( ),
26                               iorequest->getLength( ),
27                               iorequest->getBuffAddress( )));
28            service->incWatermark( );
29            delete iorequest;
30            cIO-> setHostID(hd);
31            IOcompO->queue(cIO);
32            elapsedTime = initialT - systemGetTime( );
33            if (elapsedTime < IOTime)
34            {
35                if (service->getPricing( ) == BASIC)
36                    systemWait (IOTime - elapsedTime);
37                else
38                {
39                    if (service->getWatermark( ) == IOpS)
40                        systemWait (IOTime - elapsedTime);
41                    else if (service->getWatermark( ) > IOpS)
42                        systemWait (incDelay(service->getWatermark( ),
43                                    IOpS, IOTime,
44                                    elapsedTime));
45                    else
46                        systemWait (decDelay(service->getWatermark( ),
47                                    IOpS, IOTime,
48                                    elapsedTime));
49                }
50            }
51        }
52    }
53 }
```

The routine "IOHandler" receives a pointer to an instance of the class "IOService" that represents a remote computer/LUN pair, as well as pointers to the IOreqQ input queue (for example, IOreqQ 703 in FIG. 7) associated with the remote computer/LUN pair and a pointer to the outQueue (708 in FIG. 7). The local variable "IOpS," declared on line 8, represents the maximum rate of I/O request servicing contracted for by the remote computer and the local variable "IOTime," declared and initialized on line 10, represents the expected time required to service a single I/O request at the maximum rate IOpS. On line 15, IOHandler starts execution of a separate thread running the routine "adjuster," to be described below (709 in FIG. 7). Then, the routine IOHandler continuously executes the while-loop comprising lines 16–52 to dequeue I/O requests from the associated IOreqQ and service these I/O requests. This while-loop is terminated when either or both of the associated IOreqQ or the outQueue are terminated.

On line 18, IOHandler checks to see whether the associated IOreqQ is empty, and if so, calls the system routine "systemWaitOnQueueEvent" to wait until an I/O request is queued to theIOreqQ. On line 19, IOHandler dequeues the next I/O request from the input queue. On line 22, the I/O handler sets the variable "initialT" to the current time via a call to the system function "systemGetTime." On lines 23–27, IOHandler calls the system routine "systemIO" to carry out the I/O request, the system routine returning a pointer to an instance of the class "completedIO." On line 28, IOHandler increments the watermark (710 in FIG. 7) representing the approximate instantaneous rate of I/O request servicing for the remote computer/LUN pair associated with the current instance of the IOHandler routine. Incrementing the watermark reflects servicing of the I/O request completed on lines 23–27.

On line 31, IOHandler queues the instance of the class "IOcompletion" to the outQueue (708 in FIG. 7) and, on line 32, sets the local variable "elapsedTime" to the time that elapsed during servicing of the I/O request. The local variable "IOTime" is initialized to one divided by the contracted-for maximum rate of I/O request servicing and represents, in milliseconds, the expected time for servicing an I/O request at the contracted-for rate of I/O request servicing. If the time elapsed during servicing of the I/O request is less than the expected I/O request servicing time, as detected by IOHandler on line 33, then IOHandler may pause before continuing to service subsequent I/O requests in order to not exceed the contracted-for maximum rate of I/O request servicing. If the remote computer has contracted for the basic pricing tier, or simplistic throttling mechanism, as detected by IOHandler on line 35, then IOHandler calls the system function "systemWait" on line 36 to wait for a time equal to the difference between the expected I/O time and the actual time required for processing the I/O request. Otherwise, the remote computer has contracted for the premium pricing tier corresponding to the sliding window throttling mechanism. In the latter case, a more complex consideration needs to be made with regard to the time to wait before continuing to process I/O requests. If the current instantaneous rate of I/O requests for servicing, represented by the watermark, is equal to the contracted-for maximum rate of I/O request servicing, stored in local variable "IOpS," then IOHandler calls the system function "systemWait," on line 42, to wait for a time equal to the difference between the expected time to service the request and the actual time lapsed during servicing of the just-serviced I/O request. If, on the other hand, the watermark is greater than the contracted-for maximum rate of I/O request servicing, as detected by IOHandler on line 43, then IOHandler calls the system function "systemWait," on line 44, to wait for some longer period of time returned by a call to the routine "incDelay," to be described below. Otherwise, the watermark is less than the contracted-for maximum rate of I/O request servicing, and IOHandler, on line 48, calls the system routine "systemWait" to wait for a shorter period of time prior to resuming servicing of I/O requests.

The routines "incDelay" and "decDelay" follow:

```
1  int  incDelay(int watermark, int IOpS, int IOTime, int elapsedTime)
2  {
3       float t;
4       t = (watermark/IOpS) * (IOTime – elapsedTime);
5       if(t > MAX_DELAY * IOTime) t = MAX_DELAY * IOTime;
6       return (t);
7  }
1  int  decDelay(int watermark, int IOpS, int IOTime, int elapsedTime)
2  {
3       float t;
4       t = (1/(IOpS – watermark)) * (IOTime – elapsedTime);
5       return (t);
6  }
```

Many different strategies can be used for adjusting the rate of I/O request servicing in order to attempt to bring the overall rate of I/O request servicing as close as possible to the contracted-for rate of I/O request servicing. The above routines "incDelay" and "decDelay" represent but one example of various strategies that might be applied. In the routine "incDelay," used to increase the delay between processing of I/O requests by IOHandler and thus bring the instantaneous I/O request servicing down toward the contracted-for rate of I/O request servicing, the difference between the expected time for processing the most recent I/O request and the actual processing time is multiplied by the ratio of the instantaneous rate of request processing divided by the contracted-for rate of request processing, the ratio greater than one in the case that the routine "incDelay" is called. On line 5, if the increased delay exceeds some maximum value based on the expected I/O request servicing time, then the delay is adjusted to that maximum value based on the expected I/O request time. In the routine "decDelay," called to decrease the delay between I/S request servicing by IOHandler and thus increase the instantaneous rate of I/O request handling, the difference between the expected I/O request servicing time and the actual time required to service the most recent I/O request is multiplied, on line 4, by the reciprocal of the difference between the contracted-for rate of I/O request servicing (IOpS) and the current instantaneous rate of I/O request servicing.

Finally, C++-like pseudocode for the routine "adjuster" is provided:

```
1  void adjuster (void* s, void* iQ, void* oQ)
2  {
3       IOService*          sevice = static_cast<IOService*>(s);
4       IORequestQueue*     IOreqQ =
                            static_cast<IORequestQueue*>(iQ);
5       completedIOQueue*   IOcompQ =
                            static_cast<completedIOQueue*>(oQ);
6       int                 OpS = service->getMaxIOPS( );
```

```
7       float               reciprocalIOps = 1/IOpS;
8       int                 IOTime = (reciprocalIOps * 1000);
9       while (!IOreqQ->terminated( ) && !IOcompQ->terminated( ))
10      {
11          systemWait(IOTime);
12          service->decWatermark( );
13      }
14  }
```

The routine adjuster is quite simple, continuously executing a while-loop comprising lines 9–13 in which adjuster decrements the watermark, or instantaneous rate of I/O request servicing, at fixed intervals of time. By adjusting the watermark downward, adjuster essentially slides forward the point in time from which the recent history of I/O request servicing is considered for calculating instantaneous rate of I/O request servicing. Alternatively, adjuster can be thought of as decrementing the instantaneous rate of I/O request servicing to reflect passage of time.

Although the present invention has been described in terms of a particular embodiment, it is not intended that the invention be limited to this embodiment. Modifications within the spirit of the invention will be apparent to those skilled in the art. For example, the present invention may be incorporated into electronic circuitry, firmware, or software depending on the implementation of the storage device controller that incorporates the present invention. The C++-like pseudocode, provided above, is meant only for illustration and is not in any way intended to limit to constrain the almost limitless number of implementations possible for the present invention. As noted above, many different strategies for increasing and decreasing the delay times between processing or servicing of I/O requests, embodied above in the functions "incDelay" and "decDelay," can be used to provide various amplitudes and periods of oscillations in the change in the instantaneous rate of I/O request servicing for particular remote computer/LUN pairs. In fact, in certain embodiments, the functions themselves may be adjusted over time in order to appropriately dampen oscillations and most closely adhere to the contracted-for rate of I/O request processing. From the standpoint of software implementations, an almost limitless number of strategies and code organizations can be employed to implement the present invention in many different types of computer languages for execution on many different types of processors. The basic strategy for sliding window throttling can be modified to provide further optimization in disk array producing of I/O requests. For example, the disk array controller may elect to provide a greater overall rate of I/O request processing than contracted for to remote computers in the event that the disk array has sufficient I/O request servicing capacity and that provision of greater-than contracted rates of I/O request processing does not deleteriously impact any remote computer. Additional strategies may be used when the rate of generation of I/O requests exceeds the capacity for I/O request servicing by a disk array or other storage device for an extended period of time. The present invention is described in terms of disk arrays, but as noted above, the present invention may be employed in almost any type of storage device controller, and, more generally, in almost any type of client/server application.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for fairly servicing, by a request servicing device, electronic requests received by the request servicing device from request generating devices interconnected with the request receiving device, the method comprising:
   establishing a pricing tier for each request generating device, a maximum rate of request servicing, and an expected time for serving a request at the maximum rate of request servicing;
   for each request generating device with a premium pricing tier, maintaining an instantaneous rate of request servicing by the request servicing device;
   following servicing of each request from a request generating device by the request servicing device,
      determining a time elapsed during servicing of the request;
      when the time elapsed during servicing of the request is less than the expected time for serving a request established for the request generating device,
         calculating a remaining time equal to the difference between expected time for serving a request established for the request generating device and the time elapsed during servicing of the request; and
         waiting for a length of time based on the calculated remaining time prior to servicing another request for the request generating device.

2. The method of claim 1 wherein the length of time based on the calculated remaining time is determined to be:
   the calculated remaining time for a request generating device for which the established pricing tier is a basic pricing tier;
   the calculated remaining time for a request generating device for which the established pricing tier is a premium pricing tier and the instantaneous rate of request servicing is equal to the maximum rate of request servicing established for the request generating device;
   greater than the calculated remaining time for a request generating device for which the established pricing tier is a premium pricing tier and the instantaneous rate of request servicing is greater than the maximum rate of request servicing established for the request generating device; and
   less than the calculated remaining time for a request generating device for which the established pricing tier is a premium pricing tier and the instantaneous rate of request servicing is less than the maximum rate of request servicing established for the request generating device.

3. The method of claim 2 wherein the request generating device is a computer.

4. The method of claim 2 wherein the request servicing device is an electronic data storage device.

5. The method of claim 4 wherein the electronic data storage device is a disk array.

6. The method of claim 1 wherein the maximum rate of request servicing is established via specification of a maximum rate of request servicing by the request generating device.

7. The method of claim 1 wherein the maximum rate of request servicing is established by partitioning the capacity of the request servicing device among the request generating devices in order to provide, when possible, each request generating device with a maximum rate of request servicing specified by the request generating device, and otherwise to provide each request generating device with a maximum rate of request servicing proportional to a maximum rate of request servicing specified by the request generating device.

8. The method of claim 1 wherein the request servicing device may dynamically alter the maximum rate of request servicing provided to one or more request generating devices in accordance with a rate at which the request servicing device receives requests and according to the request servicing capacity of the request serving device.

9. The method of claim 1 wherein maintaining an instantaneous rate of request servicing by the request servicing device further comprises:
   initially setting the instantaneous rate of request servicing for a request generating device to one request divided by the expected time for serving a request at the maximum rate of request servicing established for the request generating device;
   increasing the instantaneous rate of request servicing for the request generating device by one following servicing of a request generated by the request generating device; and
   decreasing the instantaneous rate of request servicing for the request generating device by one at regular intervals of time.

10. A request servicing device that fairly services electronic requests received by the request servicing device from request generating devices interconnected with the request receiving device, the request servicing device including:
   a memory that contains an established maximum rate of request servicing, an expected time for serving a request at the maximum rate of request servicing, and a pricing tier for each request generating device and that contains, for each request generating device with a premium pricing tier, an instantaneous rate of request servicing by the request servicing device; and
   control functionality that services electronic requests received from the request generating devices and that, following servicing of each request from a request generating device by the request servicing device, determines a time elapsed during servicing of the request so that, when the time elapsed during servicing of the request is less than the expected time for serving a request established for the request generating device, the control functionality calculates a remaining time equal to the difference between expected time for serving a request established for the request generating device and the time elapsed during servicing of the request and waits for a length of time based on the calculated remaining time prior to servicing another request for the request generating device.

11. The request servicing device of claim 10 wherein the length of time based on the calculated remaining time is determined by the request servicing device to be:
   the calculated remaining time for a request generating device for which the established pricing tier is a basic pricing tier;

the calculated remaining time for a request generating device for which the established pricing tier is a premium pricing tier and the instantaneous rate of request servicing is equal to the maximum rate of request servicing established for the request generating device;

greater than the calculated remaining time for a request generating device for which the established pricing tier is a premium pricing tier and the instantaneous rate of request servicing is greater than the maximum rate of request servicing established for the request generating device; and less than the calculated remaining time for a request generating device for which the established pricing tier is a premium pricing tier and the instantaneous rate of request servicing is less than the maximum rate of request servicing established for the request generating device.

12. The request servicing device of claim 10 wherein the request generating device is a computer.

13. The request servicing device of claim 10 wherein the request servicing device is an electronic data storage device.

14. The request servicing device of claim 10 wherein the electronic data storage device is a disk array.

15. The request servicing device of claim 10 wherein the maximum rate of request servicing is established via specification of a maximum rate of request servicing by the request generating device.

16. The request servicing device of claim 10 wherein the maximum rate of request servicing is established by partitioning the capacity of the request servicing device among the request generating devices in order to provide, when possible, each request generating device with a maximum rate of request servicing specified by the request generating device, and otherwise to provide each request generating device with a maximum rate of request servicing proportional to a maximum rate of request servicing specified by the request generating device.

17. The request servicing device of claim 10 wherein the request servicing device may dynamically alter the maximum rate of request servicing provided to one or more request generating devices in accordance with a rate at which the request servicing device receives requests and according to the request servicing capacity of the request serving device.

18. The request servicing device of claim 10 wherein maintaining an instantaneous rate of request servicing by the request servicing device further comprises:

initially setting the instantaneous rate of request servicing for a request generating device to one request divided by the expected time for serving a request at the maximum rate of request servicing established for the request generating device;

increasing the instantaneous rate of request servicing for the request generating device by one following servicing of a request generated by the request generating device; and decreasing the instantaneous rate of request servicing for the request generating device by one at regular intervals of time.

19. The request servicing device of claim 18 wherein separate execution threads in a firmware or software implementation of control functionality within the request servicing device increase the instantaneous rate of request servicing and decrease the instantaneous rate of request servicing.

20. The request servicing device of claim 10 wherein the length of time based on the calculated remaining time determined by the request servicing device to be greater than the calculated remaining time for a request generating device is further determined to be a ratio multiplied by the calculated remaining time, the ratio calculated by dividing the instantaneous rate of request servicing by the expected time for serving a request, and wherein the length of time based on the calculated remaining time determined by the request servicing device to be less than the calculated remaining time for a request generating device is further determined to be a ratio multiplied by the calculated remaining time, the ratio calculated by dividing one by the difference between the expected time for serving a request and the instantaneous rate of request servicing.

* * * * *

UNITED STATES PATENT AND TRADEMARK OFFICE
CERTIFICATE OF CORRECTION

PATENT NO. : 7,031,928 B1 Page 1 of 1
APPLICATION NO. : 09/678168
DATED : April 18, 2006
INVENTOR(S) : Robert Alan Cochran It is certified that error appears in the above-identified patent and that said Letters Patent is hereby corrected as shown below:

In column 15, line 3, delete "IOreqO" and insert -- IOreqQ --, therefor.

In column 15, line 16, delete "IOcompO" and insert -- IOcompQ --, therefor.

In column 17, line 48, delete "$^{1}/_{9}$" and insert -- I/O --, therefor.

In column 17, line 62, delete "sevice" and insert -- service --, therefor.

Signed and Sealed this

Thirteenth Day of July, 2010

David J. Kappos
*Director of the United States Patent and Trademark Office*